United States Patent
Kondo

(10) Patent No.: US 10,131,772 B2
(45) Date of Patent: Nov. 20, 2018

(54) RUBBER COMPOSITION FOR BASE TREAD, AND PNEUMATIC TIRE

(71) Applicant: SUMITOMO RUBBER INDUSTRIES, LTD., Kobe-shi, Hyogo (JP)

(72) Inventor: Toshikazu Kondo, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 304 days.

(21) Appl. No.: 14/187,452

(22) Filed: Feb. 24, 2014

(65) Prior Publication Data

US 2014/0275331 A1 Sep. 18, 2014

(30) Foreign Application Priority Data

Mar. 12, 2013 (JP) .................................. 2013-49255

(51) Int. Cl.
*C08L 7/00* (2006.01)
*B60C 1/00* (2006.01)
*C08L 9/00* (2006.01)

(52) U.S. Cl.
CPC .............. *C08L 7/00* (2013.01); *B60C 1/0016* (2013.01); *C08L 9/00* (2013.01)

(58) Field of Classification Search
CPC ... C08L 7/00; C08L 9/00; C08L 15/00; B60C 1/0016; C08K 3/36; C08K 5/548
USPC ....................................................... 523/156
See application file for complete search history.

(56) References Cited

U.S. PATENT DOCUMENTS

| 3,297,667 | A | * | 1/1967 | Von Dohlen et al. ......... 526/160 |
| 4,914,248 | A | * | 4/1990 | Kitagawa et al. ............. 525/113 |
| 2010/0071827 | A1 | * | 3/2010 | Miyazaki ...................... 152/565 |
| 2010/0210760 | A1 | * | 8/2010 | Kitagawa et al. ............. 523/468 |
| 2012/0283354 | A1 | * | 11/2012 | Hattori et al. ................. 523/155 |
| 2013/0172489 | A1 | * | 7/2013 | Kloppenburg ..... A63B 37/0003 525/242 |

FOREIGN PATENT DOCUMENTS

| JP | 2012-111795 | * | 6/2012 | ................ C08L 7/00 |
| JP | 2012-111795 A | | 6/2012 | |
| JP | 2012-219224 A | | 11/2012 | |
| WO | WO 2011-101399 | * | 8/2011 | ............ C08F 136/06 |

OTHER PUBLICATIONS

Japanese Office Action, dated Oct. 4, 2016, for Japanese Application No. 2013-049255.

* cited by examiner

*Primary Examiner* — Alexander C Kollias
(74) *Attorney, Agent, or Firm* — Birch, Stewart, Kolasch & Birch, LLP

(57) ABSTRACT

Provided are a rubber composition for a base tread capable of improving fuel efficiency, handling stability, and durability (flex crack growth resistance) in a balanced manner, and a pneumatic tire formed from the rubber composition. The present invention relates to a rubber composition for a base tread, including: a rubber component and a reinforcing agent, the rubber component including natural rubber, a butadiene rubber (1) containing 1,2-syndiotactic polybutadiene crystals, a butadiene rubber (2) synthesized in the presence of a rare earth catalyst, and a modified butadiene rubber (3) having a cis content of not more than 50% by mass.

2 Claims, No Drawings

RUBBER COMPOSITION FOR BASE TREAD, AND PNEUMATIC TIRE

TECHNICAL FIELD

The present invention relates to a rubber composition for a base tread, and a pneumatic tire having a base tread including the rubber composition.

BACKGROUND ART

As more fuel-efficient vehicles are pursued to protect the global environment, tires for vehicles with reduced rolling resistance are needed. For example, there has been proposed a tire with reduced rolling resistance which has a double-layer structure including a base tread (inner layer) with low energy loss and a cap tread (outer layer) with excellent abrasion resistance in the tread portion, which largely affects the rolling resistance.

In such a tire, reducing the amount of reinforcing agent in a rubber composition for a base tread is known to reduce the energy loss of the rubber composition, but such a method reduces the rubber stiffness and thus deteriorates the handling stability (steering performance). Further, with this method, even if the amount of vulcanizing agent such as sulfur is increased to enhance the stiffness, the durability tends to be poor.

Patent Literature 1 discloses a rubber composition for a base tread including certain amounts of a natural rubber, a butadiene rubber containing 1,2-syndiotactic polybutadiene crystals, a butadiene rubber synthesized in the presence of a rare earth catalyst, and a reinforcing agent, and exhibiting an improved property balance among fuel efficiency, handling stability, and durability. However, there still remains room for improvement in performance.

CITATION LIST

Patent Literature

Patent Literature 1: JP-A 2012-111795

SUMMARY OF INVENTION

Technical Problem

The present invention aims to solve the problem and provide a rubber composition for a base tread capable of improving fuel efficiency, handling stability, and durability (flex crack growth resistance) in a balanced manner, and a pneumatic tire formed from the rubber composition.

Solution to Problem

One aspect of the present invention is a rubber composition for a base tread, comprising: a rubber component and a reinforcing agent, the rubber component comprising natural rubber, a butadiene rubber (1) containing 1,2-syndiotactic polybutadiene crystals, a butadiene rubber (2) synthesized in the presence of a rare earth catalyst, and a modified butadiene rubber (3) having a cis content of not more than 50% by mass.

Preferably, an amount of the natural rubber is not less than 50% by mass, an amount of the butadiene rubber (1) is 5 to 30% by mass, and a combined amount of the butadiene rubber (2) and the modified butadiene rubber (3) is 5 to 30% by mass, each based on 100% by mass of the rubber component.

Preferably, in the rubber composition for a base tread, an amount of the reinforcing agent based on 100% by mass of the total mass of the rubber composition is 25 to 35% by mass, and the amount of the reinforcing agent and an acetone extractable content satisfy the following formula:

3.0≤(amount of reinforcing agent)/(acetone extractable content)≤9.0.

The modified butadiene rubber (3) is preferably at least one selected from the group consisting of a butadiene rubber modified with a compound represented by formula (I) below, a butadiene rubber modified with a low molecular weight compound that contains a glycidylamino group within a molecule, and a butadiene rubber modified with a mixture of a low molecular weight compound that contains a glycidylamino group within a molecule and an oligomer that is a multimer of the low molecular weight compound,

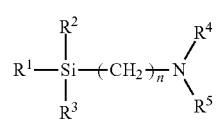

wherein $R^1$, $R^2$, and $R^3$ are the same as or different from one another and each represent an alkyl group, an alkoxy group, a silyloxy group, an acetal group, a carboxyl group, a mercapto group, or a derivative thereof; $R^4$ and $R^5$ are the same as or different from each other and each represent a hydrogen atom or an alkyl group, and $R^4$ and $R^5$ may optionally be joined to each other to form a ring structure with the nitrogen atom; and n represents an integer.

The low molecular weight compound containing a glycidylamino group within a molecule is preferably a compound represented by the following formula:

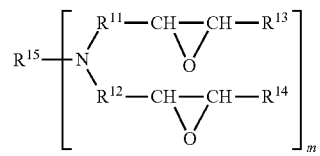

wherein $R^{11}$ and $R^{12}$ are the same as or different from each other and each represent a C1-C10 hydrocarbon group which may optionally contain at least one group selected from the group consisting of ether and tertiary amine groups; $R^{13}$ and $R^{14}$ are the same as or different from each other and each represent a hydrogen atom or a C1-C20 hydrocarbon group which may optionally contain at least one group selected from the group consisting of ether and tertiary amine groups; $R^{15}$ represents a C1-C20 hydrocarbon group which may optionally contain at least one group selected from the group consisting of ether, tertiary amine, epoxy, carbonyl, and halo groups; and m represents an integer of 1 to 6.

Another aspect of the present invention is a pneumatic tire, comprising a base tread comprising the rubber composition.

Advantageous Effects of Invention

In one aspect of the present invention, there is provided a rubber composition for a base tread including natural rubber, a butadiene rubber (1) containing 1,2-syndiotactic polybutadiene crystals, a butadiene rubber (2) synthesized in the presence of a rare earth catalyst, a modified butadiene rubber (3) having a cis content of not more than 50% by mass, and a reinforcing agent. Such a rubber composition provides a pneumatic tire having improved fuel efficiency, handling stability, and durability in a balanced manner.

DESCRIPTION OF EMBODIMENTS

One aspect of the present invention is a rubber composition for a base tread including a rubber component and a reinforcing agent. The rubber component includes natural rubber, a butadiene rubber (1) (hereinafter, also referred to as SPB-containing BR) containing 1,2-syndiotactic polybutadiene crystals, a butadiene rubber (2) (hereinafter, also referred to as rare earth-catalyzed BR) synthesized in the presence of a rare earth catalyst, and a modified butadiene rubber (3) (hereinafter, also referred to as modified low-cis BR) having a cis content of not more than 50% by mass.

The combined use of the SPB-containing BR and the rare earth-catalyzed BR as butadiene rubber enhances the property balance among rolling resistance (fuel efficiency), handling stability (steering performance), and durability (flex crack growth resistance). The further use of the modified low-cis BR improves the dispersibility of filler and thus synergistically improves the aforementioned property balance, particularly the balance between rolling resistance and durability.

The natural rubber (NR) may be one commonly used in the tire industry, and examples thereof include RSS#3 and TSR20.

The amount of NR based on 100% by mass of the rubber component is preferably not less than 50% by mass, more preferably not less than 55% by mass, and still more preferably not less than 58% by mass. If the amount is less than 50% by mass, favorable durability may not be secured. The amount of NR is preferably not more than 80% by mass and more preferably not more than 70% by mass. If the amount is more than 80% by mass, the fuel efficiency, handling stability, and durability may not be improved in a balanced manner because of the small proportion of the other rubbers.

The SPB-containing BR may be one commonly used in the tire industry. Preferred examples thereof include those in which 1,2-syndiotactic polybutadiene crystals are dispersed while being chemically bonded to BR. Such SPB-containing BR provides sufficient complex modulus, improves the stiffness, and performs well with respect to handling stability.

The 1,2-syndiotactic polybutadiene crystals preferably have a melting point of not lower than 180° C., more preferably not lower than 190° C. If the melting point is lower than 180° C., the 1,2-syndiotactic polybutadiene crystals may melt during rubber kneading, which may cause a reduction in stiffness. The melting point is preferably not higher than 220° C. and more preferably not higher than 210° C. If the melting point is higher than 220° C., the crystals tend to be poorly dispersed in the rubber composition.

The amount of 1,2-syndiotactic polybutadiene crystals in the SPB-containing BR is preferably not less than 2.5% by mass and more preferably not less than 10% by mass. If the amount is less than 2.5% by mass, the stiffness may not be sufficiently improved. The amount is preferably not more than 20% by mass and more preferably not more than 18% by mass. If the amount is more than 20% by mass, the SPB-containing BR may be less likely to be dispersed in the rubber composition.

The amount of SPB-containing BR based on 100% by mass of the rubber component is preferably not less than 5% by mass, more preferably not less than 15% by mass, and still more preferably not less than 20% by mass. If the amount is less than 5% by mass, the stiffness may not be sufficiently improved. The amount of SPB-containing BR is preferably not more than 30% by mass and more preferably not more than 28% by mass. If the amount is more than 30% by mass, the fuel efficiency, handling stability, and durability may not be improved in a balanced manner because of the small proportion of the other rubbers.

The rare earth-catalyzed BR may be one commonly used in the tire industry, and examples thereof include rare earth-catalyzed BRs as described in JP 2012-111795 A (which is incorporated by reference in the entirety). Examples of rare earth catalysts that can be used in the synthesis of the rare earth-catalyzed BR include catalysts containing a lanthanide rare earth element compound, an organoaluminium compound, an aluminoxane, or a halogen-containing compound optionally together with a Lewis base. In particular, Nd catalysts containing a neodymium (Nd)-containing compound as a lanthanide rare earth element compound are preferred because then high-cis and low-vinyl BR can be obtained.

The rare earth-catalyzed BR preferably has a Mooney viscosity ($ML_{1+4}$ (100° C.)) of not lower than 35, more preferably not lower than 40. If the Mooney viscosity is lower than 35, the resulting unvulcanized rubber composition may be less viscous and thus fail to ensure a proper thickness after vulcanization. The Mooney viscosity is preferably not higher than 55 and more preferably not higher than 50. If the Mooney viscosity is higher than 55, the resulting unvulcanized rubber composition may harden too much and thus be difficult to extrude into an extrudate with smooth edges.

The Mooney viscosity is determined in accordance with ISO289 or JIS K6300.

The rare earth-catalyzed BR preferably has a ratio (Mw/Mn) of weight average molecular weight (Mw) to number average molecular weight (Mn) of not less than 1.2, more preferably not less than 1.5. If the ratio is less than 1.2, the processability of the rubber composition tends to be poor. The Mw/Mn is preferably not more than five and more preferably not more than four. If the Mw/Mn is more than five, the effect of improving the fuel efficiency tends to be reduced.

The Mw of the rare earth-catalyzed BR is preferably not less than 300,000 and more preferably not less than 480,000, whereas it is preferably not more than 1,000,000 and more preferably not more than 800,000. The Mn of the rare earth-catalyzed BR is preferably not less than 100,000 and more preferably not less than 150,000, whereas it is preferably not more than 600,000 and more preferably not more than 400,000. If the Mw or Mn is less than the corresponding lower limit, then the fuel efficiency and durability tend to be poor. If the Mw or Mn is more than the corresponding upper limit, then the processability tends to be poor.

The rare earth-catalyzed BR preferably has a cis content of not less than 90% by mass, more preferably not less than 93% by mass, and still more preferably not less than 95% by mass. If the cis content is less than 90% by mass, the fuel efficiency may not be sufficiently improved.

The rare earth-catalyzed BR preferably has a vinyl content of not more than 0.9% by mass, more preferably not more than 0.8% by mass. If the vinyl content is more than 0.9% by mass, then the fuel efficiency and durability tend to be poor.

In the present invention, the modified low-cis BR (modified BR with a low cis content) is used. This remarkably improves the property balance among fuel efficiency, handling stability, and durability. In particular, in such formulations with silica, the silica dispersibility is enhanced and thus the balance between rolling resistance and durability can be remarkably improved.

The modified low-cis BR may be, for example, a low-cis BR modified with a compound that contains a functional group containing at least one type of atom selected from the group consisting of nitrogen, oxygen, and silicon. Examples thereof include chain-end-modified low-cis BR which has at least one chain end modified with the compound containing the functional group (modifier); backbone-modified low-cis BR which has the functional group in a backbone; and backbone- and chain-end-modified low-cis BR which has the functional group in a backbone and a chain end (for example, a backbone- and chain-end-modified low-cis BR that has the functional group in a backbone and has at least one chain end modified with the modifier), and preferably chain-end-modified low-cis BR.

The functional group may be, for example, an amino group, an amide group, an alkoxysilyl group, an isocyanate group, an imino group, an imidazole group, an urea group, an ether group, a carbonyl group, an oxycarbonyl group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxy group, an oxy group, an epoxy group, or the like. These functional groups may have a substituent. In particular, the functional group is preferably a primary, secondary, or tertiary amino group (particularly a glycidylamino group), an epoxy group, a hydroxy group, an alkoxy group (preferably a C1-C6 alkoxy group), or an alkoxysilyl group (preferably a C1-C6 alkoxysilyl group) because they are highly effective in enhancing the fuel efficiency.

The chain-end-modified low-cis BR is preferably a low-cis butadiene rubber modified with a compound represented by the following formula (I) (S-modified low-cis BR).

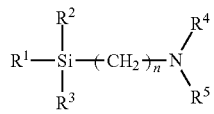

(I)

In the formula (I), $R^1$, $R^2$, and $R^3$ are the same as or different from one another and each represent an alkyl group, an alkoxy group, a silyloxy group, an acetal group, a carboxyl group (—COOH), a mercapto group (—SH), or a derivative thereof; $R^4$ and $R^5$ are the same as or different from each other and each represent a hydrogen atom or an alkyl group, and $R^4$ and $R^5$ may optionally be joined to each other to form a ring structure with the nitrogen atom; and n represents an integer.

Examples of the S-modified low-cis BR include those described in JP 2010-111753 A (which is incorporated by reference in the entirety).

In the formula (I), $R^1$, $R^2$, and $R^3$ are each suitably an alkoxy group (preferably a C1-C8 alkoxy group and more preferably a C1-C4 alkoxy group) because then excellent fuel efficiency and durability can be obtained. $R^4$ and $R^5$ are each suitably an alkyl group (preferably a C1-C3 alkyl group). Here, n is preferably an integer of 1 to 5, more preferably 2 to 4, and still more preferably 3. In cases where $R^4$ and $R^5$ are joined to each other to form a ring structure with the nitrogen atom, the ring structure is preferably a 4- to 8-membered ring. The alkoxy group may be a cycloalkoxy group (e.g. a cyclohexyloxy group) or an aryloxy group (e.g. a phenoxy group and a benzyloxy group). Use of such a preferred compound contributes to providing the effects of the present invention in a favorable manner.

Specific examples of the compound represented by the formula (I) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Among these, 3-dimethylaminopropyltrimethoxysilane, 3-dimethylaminopropyltriethoxysilane, and 3-diethylaminopropyltrimethoxysilane are preferred because they improve the aforementioned properties well. Such compounds may be used alone or two or more of these may be used in combination.

Butadiene rubber may be modified with the compound (modifier) represented by the formula (I) by any conventional method as described in JP H06-53768 B, JP H06-57767 B (which are incorporated by reference in their entirety) and the like. For example, butadiene rubber may be modified by bringing it into contact with the compound. More specifically, for example, after butadiene rubber is prepared by anionic polymerization, a certain amount of the compound may be added to the rubber solution to react the compound and the polymerizing end (active end) of the butadiene rubber.

The chain-end-modified low-cis BR is also preferably a low-cis butadiene rubber modified with a low molecular weight compound that contains a glycidylamino group within a molecule. For example, it may suitably be a low-cis butadiene rubber modified with a low molecular weight compound represented by the following formula:

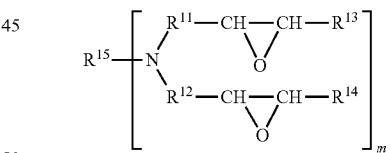

wherein $R^{11}$ and $R^{12}$ are the same as or different from each other and each represent a C1-C10 hydrocarbon group which may optionally contain at least one group selected from the group consisting of ether and tertiary amine groups; $R^{13}$ and $R^{14}$ are the same as or different from each other and each represent a hydrogen atom or a C1-C20 hydrocarbon group which may optionally contain at least one group selected from the group consisting of ether and tertiary amine groups; $R^{15}$ represents a C1-C20 hydrocarbon group which may optionally contain at least one group selected from the group consisting of ether, tertiary amine, epoxy, carbonyl, and halo groups; and m represents an integer of 1 to 6.

$R^{11}$ and $R^{12}$ are each preferably a C1-C10 alkylene group (preferably a C1-C3 alkylene group). $R^{12}$ and $R^{14}$ are each preferably a hydrogen atom. $R^{15}$ may be a C3-C20 hydrocarbon group (preferably a C6-C10 hydrocarbon group, and more preferably a C8 hydrocarbon group), and is preferably a cycloalkyl or cycloalkylene group as represented by, for example, the following formulas and more preferably a cycloalkylene group.

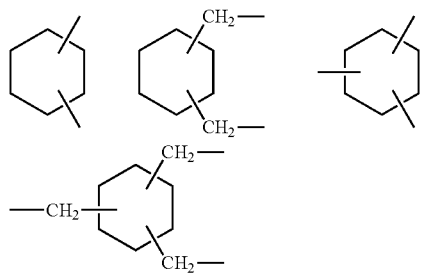

Also, m is preferably an integer of 2 to 3. Suitable examples of the compound represented by the above formula include tetraglycidylmetaxylenediamine, tetraglycidylaminodiphenylmethane, tetraglycidyl-p-phenylenediamine, diglycidylaminomethylcyclohexane, and tetraglycidyl-1,3-bisaminomethylcyclohexane.

The chain-end-modified low-cis BR is more preferably a low-cis butadiene rubber modified with a mixture of a low molecular weight compound that contains a glycidylamino group within a molecule and an oligomer that is a multimer of the low molecular weight compound (A-modified low-cis BR). Examples of the A-modified low-cis BR include those described in JP 2009-275178 A (which is incorporated by reference in the entirety) and others.

The oligomer is preferably a dimer to decamer of the low molecular weight compound. The low molecular weight compound refers to an organic compound having a molecular weight of 1000 or less, and may suitably be a compound represented by the following formula (II):

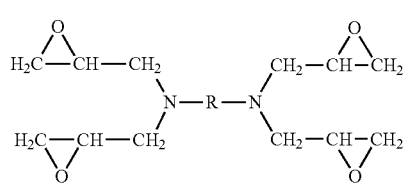

wherein R is a divalent hydrocarbon group, or a divalent organic group that contains at least one polar group selected from the group consisting of: oxygen-containing polar groups such as ether, epoxy, and ketone groups; sulfur-containing polar groups such as thioether and thioketone groups; and nitrogen-containing polar groups such as tertiary amino and imino groups. The divalent hydrocarbon group may be a saturated or unsaturated, linear, branched, or cyclic group. Examples thereof include alkylene groups, alkenylene groups, and phenylene groups. Specific examples thereof include methylene, ethylene, butylene, cyclohexylene, 1,3-bis(methylene)-cyclohexane, 1,3-bis(ethylene)-cyclohexane, o-phenylene, m-phenylene, p-phenylene, m-xylene, p-xylene, and bis(phenylene)-methane.

Specific examples of the low molecular weight compound represented by the formula (II) include tetraglycidyl-1,3-bisaminomethylcyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, and 2-[2-(N,N-diglycidylamino)ethyl]-1-glycidylpyrrolidine. Among these, tetraglycidyl-1,3-bisaminomethylcyclohexane is preferred.

The oligomer component may suitably be, for example, a dimer represented by the following formula (III) or a trimer represented by the following formula (IV).

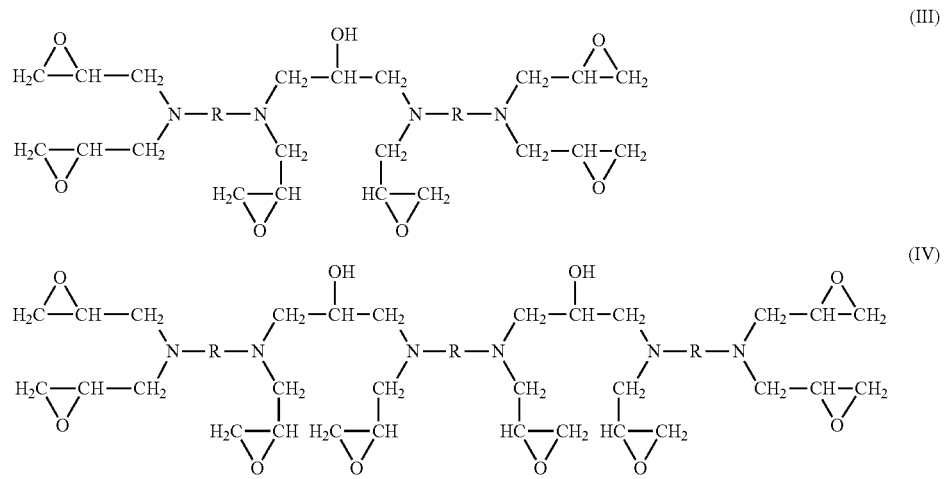

The modification with a mixture of the low molecular weight compound and the oligomer is preferably performed such that the amount of the low molecular weight compound is 75 to 95% by mass and the amount of the oligomer is 25 to 5% by mass, each based on 100% by mass of the modifier (mixture).

The ratio of the low molecular weight compound and the oligomer component in the modifier may be measured by GPC.

Specifically, the measurement is performed using a column for low molecular weight compounds to oligomer components. With respect to peaks obtained through the measurement, a perpendicular is drawn down from the first inflection point on the high molecular weight side of the peak derived from the low molecular weight compound, and the ratio of the area of the component on the low molecular weight side and the area of the component on the high molecular weight side is determined. This area ratio corresponds to the ratio of the low molecular weight compound and the oligomer component.

Here, the integration of the area under the peak on the high molecular weight side derived from the oligomer component is performed to the point of reaching 10 times the polystyrene-equivalent molecular weight of the low molecular weight compound, or to the point at which the component peak reaches 0 if the component peak reaches 0 before the point of reaching 10 times the molecular weight of the low molecular weight compound.

In the reaction between the modifier and a terminally active butadiene polymer that is synthesized by anionic polymerization using a polymerization initiator such as a lithium compound, the modifier is allowed to react with the active end of the polymer. Butadiene rubber may be modified with the low molecular weight compound containing a glycidylamino group within a molecule or a mixture of the compound and its oligomer according to the modification method using the compound (modifier) represented by the formula (I).

The modified low-cis BR has a cis content of not more than 50% by mass, preferably not more than 45% by mass, and more preferably not more than 40% by mass. If the cis content is more than 50% by mass, the rate of addition of the modifying group to the polymer tends to be reduced and the resulting polymer is less likely to interact with filler. The lower limit of the cis content is not particularly limited, and is preferably not less than 10% by mass and more preferably not less than 20% by mass. If the cis content is less than 10% by mass, then the durability and handling stability may be reduced.

The modified low-cis BR preferably has a vinyl content of not more than 35% by mass, more preferably not more than 30% by mass. If the vinyl content is more than 35% by mass, then the fuel efficiency and durability may be reduced. The lower limit of the vinyl content is not particularly limited, and is preferably not less than 1% by mass and more preferably not less than 10% by mass. If the vinyl content is less than 1% by mass, then E* may be reduced.

The modified low-cis BR preferably has a weight average molecular weight (Mw) of not less than 200,000, more preferably not less than 400,000. If the Mw is less than 200,000, sufficient durability may not be provided. The Mw is preferably not more than 900,000 and more preferably not more than 700,000. A Mw of more than 900,000 may reduce the processability and thus cause poor dispersion resulting in insufficient fuel efficiency and durability.

Herein, the cis content (cis-1,4-butadiene unit content) and the vinyl content (1,2-butadiene unit content) can be determined by infrared absorption spectrometry. The weight average molecular weight (Mw) and the number average molecular weight (Mn) can be determined with a gel permeation chromatograph (GPC) (GPC-8000 Series produced by Tosoh Corporation, detector: differential refractometer, column: TSKGEL SUPERMULTIPORE HZ-M produced by Tosoh Corporation) relative to polystyrene standards.

The combined amount of rare earth-catalyzed BR and modified low-cis BR based on 100% by mass of the rubber component is preferably not less than 5% by mass, more preferably not less than 10% by mass, and still more preferably not less than 13% by mass. If the combined amount is less than 5% by mass, sufficient fuel efficiency and durability may not be provided. The combined amount is preferably not more than 30% by mass, more preferably not more than 20% by mass, and still more preferably not more than 18% by mass. If the combined amount is more than 30% by mass, the fuel efficiency, handling stability, and durability may not be improved in a balanced manner because of the small proportion of the other rubbers.

The compounding ratio of the rare earth-catalyzed BR to the modified low-cis BR [(the amount of rare earth-catalyzed BR)/(the amount of modified low-cis BR)] is preferably 10/90 to 90/10, more preferably 20/80 to 80/20, and still more preferably 30/70 to 70/30. Adjusting the compounding ratio as mentioned above particularly improves the rolling resistance and durability and thus remarkably improves the property balance.

The combined amount of NR, SPB-containing BR, rare earth-catalyzed BR, and modified low-cis BR based on 100% by mass of the rubber component is preferably not less than 80% by mass, more preferably not less than 90% by mass, and may be 100% by mass. With such a formulation, the fuel efficiency, handling stability, and durability are well balanced.

The rubber component of the rubber composition of the present invention may contain other rubbers as long as they do not inhibit the effects of the present invention. Examples of other rubbers include isoprene rubber (IR), styrene-butadiene rubber (SBR), styrene-isoprene-butadiene rubber (SIBR), chloroprene rubber (CR), acrylonitrile-butadiene rubber (NBR), ethylene-propylene-diene rubber (EPDM), and butyl rubber (IIR).

The reinforcing agent contained in the rubber composition of the present invention may be any reinforcing filler commonly used in the tire industry, and may suitably be carbon black and/or silica. The carbon black and silica are not particularly limited, and may be commonly used ones. The silica is preferably used in combination with a known silane coupling agent to promote the silica dispersion.

The amount of reinforcing agent based on 100% by mass of the total mass of the rubber composition for a base tread of the present invention is preferably 25 to 35% by mass. Such an amount of reinforcing agent allows the fuel efficiency, handling stability, and durability to be provided in a balanced manner. The lower limit of the amount of reinforcing agent is more preferably not less than 28% by mass and still more preferably not less than 30% by mass.

The carbon black preferably has a nitrogen adsorption specific surface area ($N_2SA$) of not smaller than 50 $m^2/g$, more preferably not smaller than 70 $m^2/g$. If the $N_2SA$ is smaller than 50 $m^2/g$, sufficient reinforcement may not be provided. The $N_2SA$ of carbon black is preferably not larger than 130 $m^2/g$ and more preferably not larger than 110 $m^2/g$. If the $N_2SA$ is larger than 130 $m^2/g$, then the fuel efficiency tends to be poor.

Here, the $N_2SA$ of carbon black can be determined in accordance with the method A described in JIS K6217-2 (2001).

The amount of carbon black, if used, per 100 parts by mass of the rubber component is preferably not less than 1 part by mass and more preferably not less than 5 parts by mass. If the amount is less than 1 part by mass, sufficient reinforcement may not be provided and thus the durability and handling stability may be reduced. The amount of carbon black is preferably not more than 75 parts by mass and more preferably not more than 65 parts by mass. If the amount is more than 75 parts by mass, then the fuel efficiency tends to be poor.

The silica preferably has a nitrogen adsorption specific surface area ($N_2SA$) of not smaller than 80 $m^2/g$, more preferably not smaller than 100 $m^2/g$. If the $N_2SA$ is smaller than 80 $m^2/g$, sufficient reinforcement may not be provided. The $N_2SA$ of silica is preferably not larger than 180 $m^2/g$ and more preferably not larger than 150 m$^2$/g. If the N$_2$SA is larger than 180 m$^2$/g, then the fuel efficiency tends to be poor.

The N$_2$SA of silica is determined by the BET method in accordance with ASTM D3037-81.

The amount of silica, if used, per 100 parts by mass of the rubber component is preferably not less than 5 parts by mass, more preferably not less than 20 parts by mass, and still more preferably not less than 40 parts by mass. If the amount is less than 5 parts by mass, sufficient reinforcement may not be provided and thus the durability and handling stability may be reduced. The amount of silica is preferably not more than 75 parts by mass and more preferably not more than 65 parts by mass. If the amount is more than 75 parts by mass, then the fuel efficiency tends to be poor.

The combined amount of carbon black and silica per 100 parts by mass of the rubber component is preferably not less than 30 parts by mass and more preferably not less than 45 parts by mass. Also, the combined amount thereof is preferably not more than 90 parts by mass and more preferably not more than 65 parts by mass. If the combined amount is less than 30 parts by mass, sufficient reinforcement may not be provided and thus the durability and handling stability may be reduced. If the combined amount is more than 90 parts by mass, then the fuel efficiency tends to be poor.

In addition to the above-described ingredients, the rubber composition of the present invention may contain optional additives generally used to prepare a rubber composition, such as zinc oxide, stearic acid, antioxidants, softeners, waxes, sulfur, and vulcanization accelerators.

The rubber composition for a base tread of the present invention preferably has an acetone extractable content of not more than 10% by mass, more preferably not more than 8% by mass. If the acetone extractable content is more than 10% by mass, then the stiffness tends to be reduced and the handling stability also tends to be poor. The acetone extractable content is preferably not less than 1% by mass and more preferably not less than 3% by mass. If the acetone extractable content is less than 1% by mass, the rubber tends to be so hard that the durability can be poor.

The acetone extractable content can be measured by a method described later in the examples.

In the rubber composition for a base tread of the present invention, the amount of reinforcing agent (% by mass) and the acetone extractable content (% by mass) preferably satisfy the formula "3.0≤(amount of reinforcing agent)/(acetone extractable content)≤9.0". Such formulations improve the fuel efficiency, handling stability, and durability in a balanced manner. In the above formula, the lower limit is more preferably not less than 4.0 and still more preferably not less than 4.5, and the upper limit is more preferably not more than 8.8.

The rubber composition of the present invention can be prepared by an ordinary method. Specifically, for example, the above ingredients are kneaded using an apparatus such as a Banbury mixer, a kneader, or an open roll mill, and then vulcanized to prepare the rubber composition.

A tread consisting of a cap tread and a base tread may be prepared by any known method such as a method of laminating rubber composition sheets into a predetermined shape, or a method of feeding a rubber composition into a multiple screw extruder to form a double-layer product at the outlet of the extruder head.

The pneumatic tire of the present invention can be prepared using the rubber composition by an ordinary method. Specifically, the unvulcanized rubber composition containing optional additives is extruded into the shape of a base tread, and then arranged in a usual manner and assembled with other tire components in a tire building machine to build an unvulcanized tire. This unvulcanized tire is heat-pressurized in a vulcanizer, whereby a pneumatic tire can be prepared.

The pneumatic tire of the present invention can be suitably used as a tire for passenger cars.

EXAMPLES

The present invention is described in more detail with reference to examples. The examples are not intended to limit the scope of the present invention.

The chemicals used in the examples and comparative examples are listed below.
NR: TSR20
BR: BR150B produced by Ube Industries, Ltd.
SPB-containing BR: VCR617 (1,2-syndiotactic polybutadiene crystal dispersion, 1,2-syndiotactic polybutadiene crystal content: 17% by mass, melting point of 1,2-syndiotactic polybutadiene crystals: 200° C.) produced by Ube Industries Ltd.
Rare earth-catalyzed BR: BUNA-CB24 (BR synthesized with Nd catalyst, cis content: 96% by mass, vinyl content: 0.7% by mass, ML$_{1+4}$ (100° C.): 45, Mw/Mn: 2.69, Mw: 500,000, Mn: 186,000) produced by LANXESS K.K.
Modified low-cis BR: N103 (chain-end-modified BR obtained by polymerization using a lithium initiator, followed by modification of the polymerizing end of BR with a mixture of tetraglycidyl-1,3-bisaminomethylcyclohexane and its oligomer component; vinyl content: 12% by mass, cis content: 38% by mass, trans content: 50% by mass, Mw/Mn: 1.19, Mw: 550,000) produced by Asahi Kasei Chemicals Corporation
Carbon black: SEAST NH(N351, N$_2$SA: 74 m$^2$/g) produced by TOKAI CARBON CO., LTD.
Silica: ZEOSIL 115GR (average primary particle size: 22 nm, N$_2$SA: 115 m$^2$/g) produced by Rhodia
Silane coupling agent: Si266 produced by Evonik Degussa
Oil: Process X-140 produced by Japan Energy Corporation
Wax: Sunnoc N produced by Ouchi Shinko Chemical Industrial Co., Ltd.
Antioxidant: Antigene 6C(N-(1,3-dimethylbutyl)-N'-phenyl-p-phenylenediamine) produced by Sumitomo Chemical Co., Ltd.
Stearic acid: stearic acid "Tsubaki" produced by NOF CORPORATION
Zinc oxide: Zinc oxide #1 produced by Mitsui Mining & Smelting Co., Ltd.
Sulfur: SEIMI sulfur produced by NIPPON KANRYU INDUSTRY CO., LTD
Vulcanization accelerator: Nocceler NS(N-tert-butyl-2-benzothiazolylsulfenamide) produced by Ouchi Shinko Chemical Industrial Co., Ltd.

Examples and Comparative Examples

According to each formulation shown in Table 1, the chemicals other than the sulfur and vulcanization accelerator were kneaded with a 1.7-L Banbury mixer produced by Kobe Steel, Ltd. Next, the sulfur and vulcanization accelerator were added to the resulting kneaded mixture, and they were kneaded with an open roll mill. Thus, an unvulcanized rubber composition was prepared.

The obtained unvulcanized rubber composition was press vulcanized in a 2-mm thick mold at 150° C. for 30 minutes to prepare a vulcanized rubber composition.

Also, the unvulcanized rubber composition was formed into the shape of a base tread and assembled with other tire components in a tire building machine. Then, the assembly was vulcanized at 150° C. for 30 minutes. Thus, a test tire (tire size: 195/65R15) was prepared.

The obtained vulcanized rubber compositions and test tires were evaluated as follows. Table 1 shows the results.

(Acetone Extractable Content)

Acetone extraction of the vulcanized rubber composition was carried out in accordance with JIS K6229 to measure the amount of acetone extractable matter in the vulcanized rubber composition (expressed as % by mass). The acetone extractable content is indicative of the concentration of the low molecular weight organic compounds such as oil and wax contained in the vulcanized rubber composition. In the present invention, the acetone extraction content in accordance with JIS K6229 refers to the one expressed as % by mass that is measured by the method A out of the two methods A and B specified in JIS K6229 (2007).

(Hs)

The hardness (Hs) of the vulcanized rubber composition was measured in accordance with JIS K6253. The measurement temperature was 30° C.

(Viscoelasticity Test)

The loss tangent (tan $\delta$) and complex viscoelastic modulus ($E^*$) at a temperature of 30° C. of the vulcanized rubber composition were measured at a frequency of 10 Hz, an initial strain of 10%, and a dynamic strain of 2% using a viscoelasticity spectrometer produced by Iwamoto Seisakusho Co., Ltd. The tan $\delta$ and $E^*$ values of each formulation are each expressed as an index relative to that of Comparative Example 1 (=100), calculated using the following equation. When the index of tan $\delta$ is lower, the amount of heat build-up is smaller and thus better fuel efficiency is provided. When the index of the complex viscoelastic modulus is higher, the $E^*$ is higher and thus a harder rubber is provided.

(Index of tan $\delta$)=(tan $\delta$ of each formulation)/(tan $\delta$ of Comparative Example 1)×100

(Index of $E^*$)=($E^*$ of each formulation)/($E^*$ of Comparative Example 1)×100

(Durability (De Mattia Flex Cracking and Crack Growth Test))

The vulcanized rubber composition was evaluated in accordance with JIS K6260. The number of flexing cycles needed to increase the crack length by 1 mm was calculated and shown in the table. When the number of flexing cycles is larger, the flex crack growth resistance is higher and thus better durability is provided.

(Handling Stability (Steering Performance))

A vehicle equipped with the test tires was driven, and the steering response was evaluated by sensory evaluation by a test driver, based on the following criteria.

Excellent: Steering response is very fast.
Good: Steering response is fast.
Acceptable: Steering response is a little slow.
Poor: Steering response is slow.

(Fuel Efficiency)

The rolling resistance of the test tire was measured using a rolling resistance test machine by running the test tire with a rim of 15×6JJ at an internal pressure of 230 kPa, a load of 3.43 kN, and a speed of 80 km/h. The results are expressed as an index (rolling resistance index) relative to that of Comparative Example 1 (=100), calculated using the following equation. When the rolling resistance index is lower, the rolling resistance is lower and thus better fuel efficiency is provided.

(Rolling resistance index)=(rolling resistance of each formulation)/(rolling resistance of Comparative Example 1)×100

TABLE 1

|  |  | Comparative Example | | | Example | | | |
| --- | --- | --- | --- | --- | --- | --- | --- | --- |
|  |  | 1 | 2 | 3 | 1 | 2 | 3 | 4 |
| Formulation | NR | 60 | 60 | 60 | 60 | 60 | 60 | 60 |
| (part(s) by mass) | BR | 40 | — | — | — | — | — | — |
|  | SPB-containing BR | — | 25 | 25 | 25 | 25 | 25 | 25 |
|  | Rare earth-catalyzed BR | — | 15 | — | 10 | 5 | 10 | 5 |
|  | Modified low-cis BR | — | — | 15 | 5 | 10 | 5 | 10 |
|  | Carbon black | 55 | 55 | 55 | 45 | 45 | 5 | 5 |
|  | Silica | — | — | — | 10 | 10 | 50 | 50 |
|  | Silane coupling agent | — | — | — | 0.6 | 0.6 | 3 | 3 |
|  | Oil | 4 | 4 | 4 | 4 | 4 | 4 | 4 |
|  | Wax | 2 | 2 | 2 | 2 | 2 | 2 | 2 |
|  | Antioxidant | 3 | 3 | 3 | 3 | 3 | 3 | 3 |
|  | Stearic acid | 2 | 2 | 2 | 2 | 2 | 2 | 2 |
|  | Zinc oxide | 3 | 3 | 3 | 3 | 3 | 3 | 3 |
|  | Sulfur | 2.5 | 2.5 | 2.5 | 2.5 | 2.5 | 2.5 | 2.5 |
|  | Vulcanization accelerator | 1.8 | 1.8 | 1.8 | 1.8 | 1.8 | 1.8 | 1.8 |
| Total (parts by mass) |  | 173.3 | 173.3 | 173.3 | 173.3 | 173.3 | 176.3 | 176.3 |
| Acetone extractable content (% by mass) |  | 6 | 6 | 6 | 6 | 6 | 6 | 6 |
| Amount of reinforcing agent (% by mass) |  | 32 | 32 | 32 | 32 | 32 | 31 | 31 |
| (Amount of reinforcing agent) / (Acetone extractable content) |  | 5.3 | 5.3 | 5.3 | 5.3 | 5.3 | 5.2 | 5.2 |
| Evaluation | Hs | 62 | 64 | 63 | 64 | 64 | 65 | 64 |
|  | Index of $E^*$ | 100 | 120 | 108 | 120 | 115 | 125 | 115 |
|  | Index of tan $\delta$ (at 30° C., 2%) | 100 | 95 | 95 | 90 | 88 | 80 | 78 |
|  | Durability (Number of flexing cycles) | 2000 | 3000 | 3000 | 5000 | 4800 | 4500 | 4200 |
|  | Handling stability | Acceptable | Good | Acceptable | Excellent | Good | Excellent | Good |
|  | Fuel efficiency | 100 | 98 | 98 | 95 | 94 | 90 | 92 |

Table 1 shows that, with respect to NR/BR blend formulations, the property balance among fuel efficiency, handling stability, and durability was remarkably improved in the examples in which three types of BR, i.e., the SPB-containing BR, rare earth-catalyzed BR, and modified low-cis BR, were used as the BR component. In particular, from the results of Comparative Examples 1 to 3 and Example 1, it was demonstrated that the combined use of the three types of BR synergistically improves the properties. Further, with respect to silica formulations, which generally have good fuel efficiency but have problems in durability and the like, the above property balance was remarkably improved in the examples.

The invention claimed is:

1. A pneumatic tire having a base tread formed from a rubber composition for the base tread, the rubber composition comprising:
 a rubber component and, per 100 parts of the rubber component, 5 to 65 parts by mass of carbon black, and 10 to 65 parts by mass of silica,
 wherein the rubber component comprises:
  natural rubber;
  a butadiene rubber containing 1,2-syndiotactic polybutadiene crystals;
  a butadiene rubber synthesized in the presence of a neodymium catalyst; and
  a modified butadiene rubber with a cis content of 10 to 50% by mass,
   wherein the modified butadiene rubber is a butadiene rubber modified with at least one member selected from the group consisting of
    tetraglycidyl-1,3-bisaminomethylcyclohexane,
    N,N,N',N'-tetraglycidyl-m-xylenediamine,
    4,4-methylene-bis(N,N-diglycidylaniline),
    1,4-bis(N,N-diglycidylamino)cyclohexane,
    N,N,N',N'-tetraglycidyl-p-phenylenediamine,
    4,4'-bis(diglycidylamino)benzophenone,
    4-(4-glycidylpiperazinyl)-N,N-diglycidylaniline,
    2-[2-(N,N-diglycidylamino)ethyl]-1-gylcidylpyrrolidine, and
    a dimer to decamer thereof,
 and
  wherein, based on 100% by mass of the rubber component,
   the natural rubber is present in an amount of 50% to 80% by mass,
   the butadiene rubber containing 1,2-syndiotactic polybutadiene crystals is present in an amount of 5 to 30% by mass, and
   the butadiene rubber synthesized in the presence of the neodymium catalyst, combined with the modified butadiene rubber with a cis content of 10 to 50% by mass, is present in a combined amount of 5 to 30% by mass.

2. The pneumatic tire according to claim 1, wherein, in the rubber composition for a base tread, an amount of the reinforcing agent based on 100% by mass of the total mass of the rubber composition is 25 to 35% by mass, and the amount of the reinforcing agent and an acetone extractable content satisfy the following formula:

$$3.0 \leq (\text{amount of reinforcing agent})/(\text{acetone extractable content}) \leq 9.0.$$

* * * * *